(12) United States Patent
Milburn et al.

(10) Patent No.: US 8,782,971 B2
(45) Date of Patent: Jul. 22, 2014

(54) SYSTEM FOR PRESSURE EQUALIZING AND DRYING SEALED TRANSLUCENT GLASS GLAZING UNITS

(75) Inventors: Douglas I. Milburn, Sydney (CA); Allan Gordon Archie MacMillan, Marion Bridge (CA); Esam George Yousif, Etobicoke (CA)

(73) Assignee: Advanced Glazing Technologies Ltd. (AGTL) (CA)

( * ) Notice: Subject to any disclaimer, the term of this patent is extended or adjusted under 35 U.S.C. 154(b) by 0 days.

(21) Appl. No.: 12/841,562

(22) Filed: Jul. 22, 2010

(65) Prior Publication Data

US 2012/0017524 A1   Jan. 26, 2012

(51) Int. Cl.
- *E06B 7/12* (2006.01)
- *E06B 3/677* (2006.01)
- *E06B 3/24* (2006.01)

(52) U.S. Cl.
CPC .. *E06B 3/677* (2013.01); *E06B 3/24* (2013.01)
USPC ........................................ 52/172; 52/204.593

(58) Field of Classification Search
CPC ....... E06B 3/677; E06B 2/24; E06B 3/66328; E06B 2003/6638
USPC ......... 52/172, 204.593, 786.1, 786.13, 171.3, 52/786.11, 788.1; 34/437; 156/107, 109
See application file for complete search history.

(56) References Cited

U.S. PATENT DOCUMENTS

| | | | | |
|---|---|---|---|---|
| 1,605,583 A | * | 11/1926 | Heymer | 52/202 |
| 2,233,952 A | * | 3/1941 | Lipsett | 52/204.52 |
| 2,783,682 A | * | 3/1957 | Swenson | 359/593 |
| 2,828,235 A | * | 3/1958 | Holland et al. | 428/118 |
| 3,265,765 A | * | 8/1966 | Holden et al. | 525/271 |
| 3,629,980 A | * | 12/1971 | Hordis | 52/1 |
| 3,685,239 A | * | 8/1972 | McCurdy et al. | 52/172 |
| 3,762,118 A | * | 10/1973 | Sanders | 52/171.3 |
| 3,771,276 A | * | 11/1973 | Stewart et al. | 52/172 |
| 3,832,254 A | * | 8/1974 | Bowser et al. | 156/107 |
| 3,896,589 A | * | 7/1975 | Mitchell | 49/425 |
| 3,932,971 A | * | 1/1976 | Day | 52/171.3 |
| 4,014,733 A | * | 3/1977 | Loubet | 156/446 |
| 4,035,539 A | * | 7/1977 | Luboshez | 428/178 |
| 4,065,894 A | * | 1/1978 | Day | 52/171.3 |
| 4,198,254 A | * | 4/1980 | Laroche et al. | 156/107 |
| 4,198,796 A | * | 4/1980 | Foster | 52/203 |
| 4,346,132 A | * | 8/1982 | Cheng et al. | 428/76 |
| 4,394,806 A | * | 7/1983 | Day | 52/172 |
| 4,545,160 A | * | 10/1985 | Grether et al. | 52/172 |
| 4,567,703 A | * | 2/1986 | Ricks | 52/204.52 |
| 4,622,249 A | * | 11/1986 | Bowser | 428/34 |

(Continued)

FOREIGN PATENT DOCUMENTS

| | | |
|---|---|---|
| FR | 2917449 A1 | 12/2008 |
| GB | 1476472 | 6/1977 |
| KR | 20050042251 A | 5/2005 |
| WO | 9504205 A1 | 2/1995 |

*Primary Examiner* — William Gilbert
*Assistant Examiner* — James Ference
(74) *Attorney, Agent, or Firm* — Laubscher & Laubscher, P.C.

(57) ABSTRACT

A sealed translucent glass glazing unit includes two lites of spaced translucent glass to define a gap which contains an absorptive filler. A spacer around the perimeter of the unit seals the unit and maintains the gap. A vent tube is mounted within the spacer with one end open to the filler and one end open to the exterior.

6 Claims, 1 Drawing Sheet

(56) References Cited

U.S. PATENT DOCUMENTS

| | | | |
|---|---|---|---|
| 4,856,243 A * | 8/1989 | Ault et al. | 52/209 |
| 4,952,430 A * | 8/1990 | Bowser et al. | 428/34 |
| 5,156,895 A * | 10/1992 | Martin | 428/72 |
| 5,234,730 A * | 8/1993 | Lautenschlaeger et al. | 428/34 |
| 5,270,091 A * | 12/1993 | Krysiak et al. | 428/68 |
| 5,851,609 A * | 12/1998 | Baratuci et al. | 428/34 |
| 5,879,764 A * | 3/1999 | Chu et al. | 428/34 |
| 6,055,783 A * | 5/2000 | Guhl et al. | 52/204.62 |
| 6,463,706 B1 * | 10/2002 | Guhl et al. | 52/204.62 |
| 6,553,728 B1 * | 4/2003 | Zurn | 52/171.3 |
| 6,613,404 B2 * | 9/2003 | Johnson | 428/34 |
| 6,686,002 B2 * | 2/2004 | Auerbach | 428/34 |
| 6,699,558 B1 * | 3/2004 | Milburn | 428/73 |
| 6,860,079 B2 * | 3/2005 | Schwarz | 52/786.1 |
| 6,868,648 B2 * | 3/2005 | Glover et al. | 52/786.1 |
| 6,889,480 B2 * | 5/2005 | Guhl et al. | 52/786.1 |
| 7,241,352 B2 * | 7/2007 | Crandell | 156/109 |
| 7,293,391 B2 * | 11/2007 | Guhl et al. | 52/204.593 |
| 7,332,202 B2 * | 2/2008 | Demars et al. | 428/34 |
| 7,490,445 B2 * | 2/2009 | Steffek et al. | 52/456 |
| 7,588,653 B2 * | 9/2009 | Crandell et al. | 156/109 |
| 7,641,954 B2 * | 1/2010 | Rouanet et al. | 428/76 |
| 8,109,051 B2 * | 2/2012 | Showers | 52/204.53 |
| 8,110,258 B2 * | 2/2012 | Milburn | 428/34 |
| 2002/0009557 A1 * | 1/2002 | Shibuya et al. | 428/34 |
| 2003/0116185 A1 * | 6/2003 | Oswald | 136/251 |
| 2004/0163347 A1 * | 8/2004 | Hodek et al. | 52/506.01 |
| 2005/0034386 A1 * | 2/2005 | Crandell et al. | 52/204.5 |
| 2005/0048231 A1 * | 3/2005 | Morphet | 428/34 |
| 2005/0074566 A1 * | 4/2005 | Rouanet et al. | 428/34 |
| 2005/0100691 A1 * | 5/2005 | Bunnhofer et al. | 428/34 |
| 2006/0096632 A1 * | 5/2006 | Oswald | 136/251 |
| 2006/0260227 A1 * | 11/2006 | Winfield | 52/204.593 |
| 2007/0045893 A1 * | 3/2007 | Asthana et al. | 264/173.12 |
| 2007/0122572 A1 * | 5/2007 | Shibuya et al. | 428/34 |
| 2007/0122588 A1 * | 5/2007 | Milburn | 428/117 |
| 2007/0261795 A1 * | 11/2007 | Rosskamp et al. | 156/556 |
| 2008/0000195 A1 * | 1/2008 | Clarahan | 52/786.13 |
| 2008/0139734 A1 * | 6/2008 | Nakashima et al. | 524/505 |
| 2008/0302059 A1 * | 12/2008 | Du Plessis et al. | 52/786.11 |
| 2009/0045377 A1 * | 2/2009 | Cho et al. | 252/181.6 |
| 2009/0064608 A1 * | 3/2009 | Milburn | 52/204.62 |
| 2009/0255572 A1 * | 10/2009 | Oswald | 136/251 |
| 2009/0291608 A1 * | 11/2009 | Choi et al. | 442/394 |
| 2009/0312466 A1 * | 12/2009 | Hase | 524/100 |
| 2010/0011703 A1 * | 1/2010 | Seele et al. | 52/786.1 |
| 2010/0159190 A1 * | 6/2010 | Milburn | 428/116 |
| 2010/0163157 A1 * | 7/2010 | Milburn | 156/99 |

* cited by examiner

SYSTEM FOR PRESSURE EQUALIZING AND DRYING SEALED TRANSLUCENT GLASS GLAZING UNITS

FIELD

The present invention relates to sealed translucent glass glazing units with an absorptive filler there between. More specifically, the present invention relates to a system for pressure equalizing and drying such sealed translucent glass glazing units.

BACKGROUND

Glass glazing units are commonly used to glaze openings in buildings, but such units must be constructed with the utmost of care to prevent condensation build up, where its presence is viewed as detrimental to the functioning of the glazing system, for reason of aesthetics, grow of mold and algae, and interference with view and light transmittance.

Before the widespread introduction of sealed insulated glass units, most windows were single glazed. In cold climates, it was common to have a removable 'storm window', or second glazing layer in a wood framing system, that was installed over the outside of a single glazed window in the fall, and removed in the spring. The air gap between the two glazings was vented to the exterior (the cold side) through holes in the lower front face of the window. It was typical to use several holes, each an inch or more in diameter. By connecting the air gap to the outside where air is colder and of lower absolute humidity, condensation on the inside surface of the cold outer glass was minimized.

The industry has since moved to sealed glass glazing units. The conventional insulated glass unit is constructed of two lights of glass, surrounded by a spacer which is typically filled with a desiccant, and covered by an organic sealant with a low moisture vapor diffusion transmittance. The inside edge of the spacer is perforated so that the desiccant within dries the air in the interior of the unit, preventing condensation. There is a low but finite diffusion of moisture through the sealant, and typically these systems last for two or more decades before the appearance of internal condensation. However, should the seal fail (typically it is the bond between the glass and sealant that fails) then the unit 'breaths' exterior air as a result of natural pressure changes that are induced by daily temperature changes, and the moisture brought within quickly saturates the desiccant resulting in internal condensation, and this defines failure of the unit.

As known in the industry, there are two main types of glass units used in glazing units: vision (transparent) and translucent.

Vision glass glazing units have problems unique unto themselves. Vision glass units contain desiccant to avoid condensation in the cavity between the glass lites. For instance, in mountainous regions, if the difference in altitude between the place where an insulated glass unit is manufactured and the place where it is installed, is large enough, then the pressure differential could stress or damage seals, or break the glass, typically during transportation. In order to deal with this, capillary tubes are sometimes used to provide temporary pressure equalization for insulated glass units. The standard in North America is a stainless steel tube, 12" long and 0.020" inside diameter, installed through the perimeter seal in order to provide a controlled flow path between interior and exterior. The units are shipped to site, and allowed to pressure-equilibrate for a day or more, and the tubes are then crimped to return the unit to a fully sealed state. Although it may be advantageous for certain reasons to leave the tube open (lower stress on glass and seals as pressure differential varies), technical literature teaches that if left open, the airflow will carry in sufficient moisture to saturate the desiccant in a relatively short period of time, resulting in moisture-related failure of the unit. This ingress of moisture will fill the desiccant with moisture much sooner than if the unit was fully sealed.

Venting a vision glass unit without a desiccant is not an option as under certain conditions then some condensation will occur. Vision glass units are especially susceptible to condensation because the glass lites are transparent and condensation is very obvious.

If an ordinary vision glass unit containing desiccant within the internal airspace is vented, the desiccant will keep the air inside the unit drier, until it absorbs to capacity. Since common desiccants are two-way, the desiccant now acts as a moisture sink. In other words, the desiccant acts to equilibrate the unit to a relative humidity, so if a lite gets cold (for example during a winter evening), water will condense on the lite. This reduces the RH in the unit which in turn pulls more moisture from the desiccant. The unit then further condenses, resulting in a really wet-looking unit.

Any glass unit that is sealed will undergo internal pressure change in glass and 'pillow' in response. The amount of movement of the glass required to relieve the pressure change is directly proportional to thickness of the unit. Length or width of the unit is of secondary importance. In day to day conditions, glass can easily accommodate this pressure change if the spacing between lites is 0.5". At 1" or larger, glass breakage occurs because there is a larger quantity of air in the unit which expands when heated, and even if breakage does not occur, there is a resultant increase in stress on the seals which will lead to higher incidence of seal failure.

The Applicant is aware of a company called VisionWall that makes a large thickness vision glass unit with somewhere around 2.5" of gap. These units must be vented to relieve pressure differentials, and this is done so through tubing and a large replaceable vent cartridge that is full of desiccant (rather than having the desiccant in the glazing cavity as in normal units). This keeps inward flowing air dry until, after about a decade, the desiccant reaches capacity and must be replaced as part of regular maintenance.

A difference between vision glass glazing units and translucent glass glazing units is that translucent glazings contain absorptive material filler in the gap or cavity between the lites. This alters the physics of the system and allows different approaches to condensation control. Translucent units are typically thicker to accommodate the presence of this filler and it is understood in the industry that the larger gap can introduce a requirement for venting.

Referring to FIG. 1, the Solera™ translucent glazing unit (manufactured by the present applicant) has typically 2.5" gap between two lites of glass 100a and 100b and maintained by spacer 110, which is 5 time industry standard. The gap contains absorptive filler 130. These units will often break if fully sealed by sealant 120. It is generally accepted in the industry that gaps less than 1" is 'normal and sealable', while a gap of over 1" is considered thick and in need of venting.

Another difference between vision glass glazing units and translucent glass glazing units is that the absorptive filler in the cavity will absorb some energy from sunlight, thus increasing temperature cycling and increasing the need for venting. The absorptive materials also adsorb and desorb moisture as temperature and humidity change.

The standard approach to address the problems associated with translucent glass glazing units is to build units with gaps that are typically on the order of 0.5", fully seal the unit, and include sufficient desiccant within the gap on the perimeter to draw most of the moisture out of the initial 'air fill', with excess capacity to soak up the moisture that slowly but inevitably diffuses through the polymer seals. However, this solution has a number of drawbacks. First, the units are restricted mostly gaps less than 1". Second, the life of the unit is finite as diffusion will occur. Third, this construction is extremely sensitive to the slightest seal failure. For example, a slight contamination from, say, a fingerprint on the glass where the sealant contacts it can cause failure. Fourth, visible 'pillowing distortion' can be observed on reflective coated units at certain times of day which ruins aesthetics for some architects. Fifth, glass stress is increased, increasing statistical occurrence of breakage.

Referring again to FIG. 1, typically in translucent glass glazing units, venting is done by connecting the interior of the spacer to the intraframe cavity via a capillary tube 140. But this system had little or no ability to maintain a humidity differential such that the interior was dryer on average than the intraframe cavity. The result is that condensation can occur in transient conditions (usually upon a sudden change in weather with rapid cooling), which is not considered acceptable in the industry.

SUMMARY

For the reasons described above, venting in sealed translucent glass units is needed, and venting with a desiccant limits the life of the unit. Until now, venting with no desiccant has not provided adequate results. However the present inventors have discovered a way to provide a venting system in a translucent glass glazing unit that keeps the units free of condensation without the use of desiccant.

In a basic form, the inventors have discovered that in a translucent sealed glass glazing unit, the cavity full of adsorptive material filler experiences predicable cycling of temperature and humidity, and when the unit is vented from the glazing cavity to outside the unit with the proper time constant, the unit will stay dry and avoid the buildup moisture, as well as visible condensation.

Thus, according to one aspect, the invention provides a method for venting a translucent glazing unit that avoids condensation.

In one aspect, the invention may provide a sealed translucent glass glazing unit, comprising: two lites of translucent glass spaced apart from one another to define a gap; a filler in the gap, the filler being made of an absorptive material which is subject to temperature cycling such that the filler absorbs moisture from the air as it cools and release moisture to the air as it warms; a spacer around the perimeter of the unit to seal the unit and maintain the gap; and a vent tube mounted through the spacer with one end open to the filler and one end open to the exterior, such that air flows through the tube from the gap to the exterior when the filler is heated and air flows through the tube from the exterior to the gap when the filler is cooled, the tube being sized to maintain controlled airflow according to a predetermined time constant; wherein natural humidity equilibrium of the unit is maintained.

In another aspect, the invention may provide a sealed translucent glass glazing unit, comprising: two lites of translucent glass spaced apart from one another to define a gap; a filler in the gap, the filler being made of an absorptive material which is subject to temperature cycling such that the filler absorbs moisture from the air as it cools and release moisture to the air as it warms; a spacer around the perimeter of the unit to seal the unit and maintain the gap; and a vent tube mounted with one end open to the filler and one end open to the exterior.

In another aspect, the invention may provide a method of making a sealed translucent glass glazing unit, comprising: providing two lites of translucent glass spaced apart from one another to define a gap; placing an absorptive filler in the gap; placing a spacer around the perimeter of the unit to seal the unit and maintain the gap; and mounting a vent tube through the spacer with one end open to the filler and one end open to the exterior, such that air flows through the tube from the gap to the exterior when the filler is heated and air flows through the tube from the exterior to the gap when the filler is cooled; wherein natural humidity equilibrium of the unit is maintained.

In another aspect, the invention may provide a method of drying a sealed translucent glass glazing unit, wherein the unit comprises: two lites of translucent glass spaced apart from one another to define a gap; an absorptive filler in the gap; a spacer around the perimeter of the unit to seal the unit and maintain the gap; and a vent tube mounted within the spacer with one end open to the filler and one end open to the exterior; the method comprising the steps of: subjecting the filler to exterior temperature cycling such that the filler absorbs moisture from the air as it cools and release moisture to the air as it warms, such that air flows through the tube from the gap to the exterior when heated and air flows through the tube from the exterior to the gap when cooled, the tube being sized to maintain controlled airflow according to a predetermined time constant; whereby the unit is dried.

There are many advantages in using this method a method in accordance with the teaching of this invention. First, the system will result in units that are dryer than translucent units that are vented by connecting spacer to intraframe cavity, thereby preventing transient condensation that is experienced in spacer-vented units. This system will also last indefinitely, unlike desiccant based systems. And the vented system can be built so that pillowing and stress on seals is reduced, typically be a factor of 5, thereby reducing failure of seals and the statistical incidence of glass breakage.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein.

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE DISCLOSED EMBODIMENTS

Figure 1:
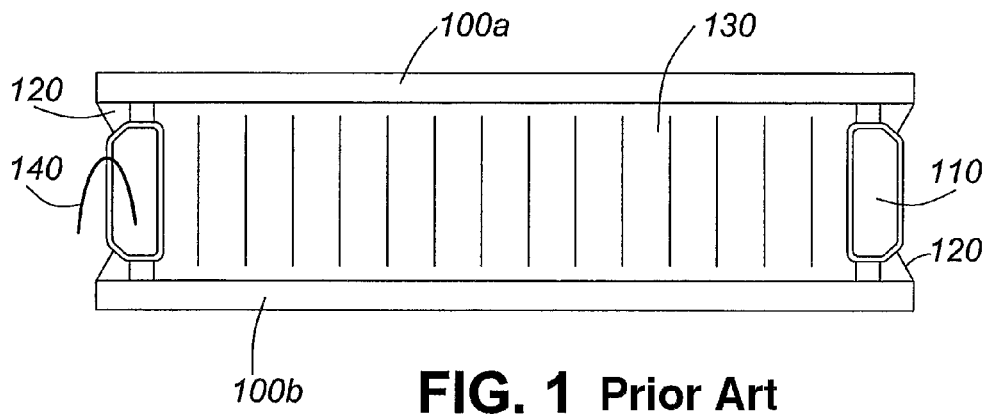
FIG. 1 illustrates a top view of a translucent, sealed glass glazing unit known in the art.
Figure 2A:
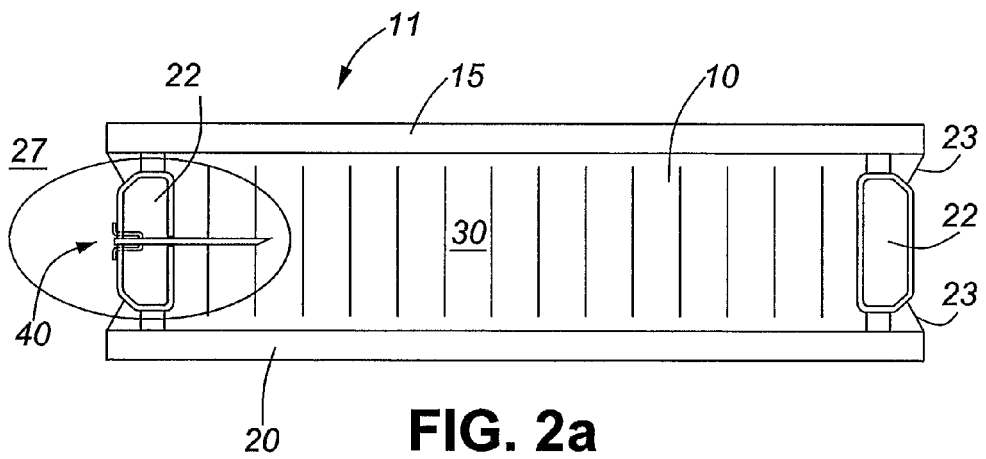
FIGS. 2a and 2b illustrate a translucent glass glazing unit with a vent tube in accordance with the teachings of this invention.

Referring to FIG. 2a, there is shown a top view of a sealed translucent glass unit 11 in accordance with the teachings of this invention. The unit 11 has a large gap 10 between two translucent glass lites 15, 20. The gap 10 could be about 2.5". The gap 10 is maintained by a spacer 22 around the perimeter of the glass lites. The gap or cavity 10 is filled with an absorptive material filler 30. The units 11 have a perimeter seal 23.

The large gap 10 presents a significant problem that is well understood in the industry. In a sealed unit 11, the pressure differential created by changes in temperature and atmospheric pressure cause stress and deformation of the glass lites 15, 20 (i.e. a positive internal pressure will cause pillowing of the glass). In very small units, glass has a relatively small aspect ratio (width or length divided by thickness) and is relatively rigid and can bear significant pressure without damage. As units get larger, the glass flexes, increasing the internal volume and reducing the internal pressure until equilibrium is reached. Similar but opposite stresses and movement occur for negative pressures. With a gap on the order of 0.5", glass in units, large or small, can resist the forces of expansion and contraction without breakage. However, units with a 2.5" gap experience five times the stress, which can be sufficient to break the glass.

For reasons discussed above, the use of a desiccant, with or without venting has not proven to be a satisfactory solution for translucent glass lites with a large gap having an absorptive filler therein. Thus, the present inventors searched for a way to be able to prevent condensation without the use of a desiccant.

Based on the inventors' research that is discussed below, the present inventors discovered a solution to this problem. To address this problem, the present inventors use vent tube(s) 40 which connect a point in the interior of the cavity 10 that is far enough from the perimeter in order to avoid edge effects, to the exterior environment 27. The vent tube 40 is sized to meet a predetermined time constant to control the flow of air, thus introducing a phase lag. This allows air flow in a controlled manner, thereby slowly equalizing pressure and preventing glass breakage. The inventors discovered that a desiccant is not needed because the absorptive nature of the filler 30 inside the translucent glass unit 11 prevents condensation by buffering (absorbing moisture from the air is it cools). The combination of correct cavity venting, time constant, buffering material, and daily temperature cycling sets up a cycle that has the effect of pumping moisture out of the unit, and maintaining a lower average humidity than ambient, which avoids condensation trapping.

The teachings in accordance with this invention revolve around the inventors' discovery that the translucent glass units 11 can be set up to create a humidity differential if vented from intraframe cavity 10 into the exterior 27 where the large amount of absorptive material 30 is exposed to major sunlight-driven temperature and humidity cycling. This is because the inventors discovered that the temperature of the filler 30 is higher than the temperature of the spacer 22 when the unit is exposed to sunlight. Thus, the air within cavity 10 filled with material 30 that is absorptive to some degree will undergo a large change in absolute humidity in response to a change in temperature. This occurs because absorptive materials react against changes in relative humidity. This phenomena is Padfield's 'buffering' effect, as known by those skilled in the art.

Another way of looking at it is that the inventors discovered that absorptive materials have absorptive capacity and will absorb moisture as the temperature drops, preventing condensation, and, when heated by sunlight, give it up to the air such that it can be breathed out through the vent tube as the heating simultaneously creates a positive pressure inside the unit. It was discovered that the effect is greatly enhanced if the correct phase lag is introduced so that flow is delayed until maximum humidity has built up inside the unit, so that the absolute humidity of the outflowing airstream is maximized, and conversely, the delay is sufficient so that inflow on cooling occurs when the intraframe cavity has experienced maximum cooling so that the absolute humidity of inflowing air is minimized, thereby creating maximum net drying from this natural cycling. So the inventors were able to build a translucent glass unit without the desiccant cartridge required to control humidity in translucent glass lites with an absorptive filler. It was discovered that one can make uses of these physical phenomena to create a system that will, when driven by the daily temperature cycling experienced in glazing units installed in buildings, become dryer than its surroundings. The larger the temperature cycling, the more pronounced the drying effect. For maximum effect, the absorptive material should have the capacity to absorb a quantity of water that is at least equal to the quantity of moisture that would be held in the air inside the entire glazing cavity at 20° C. saturated condition.

Figure 2B:
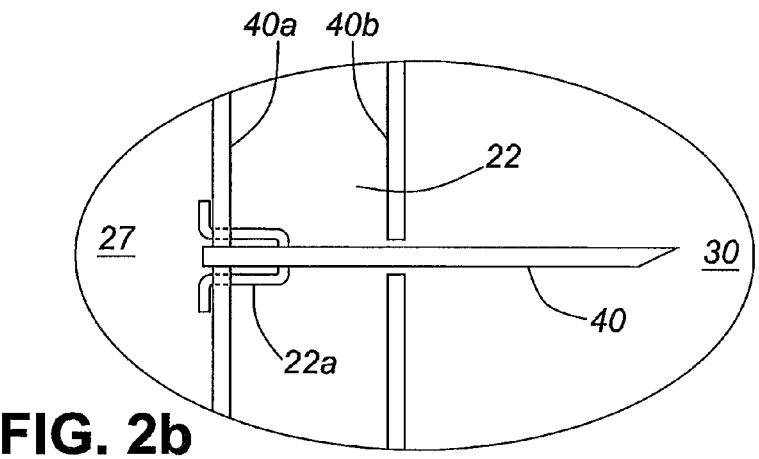

Referring to FIG. 2b, the vent tube 40 connects the space inside the absorptive material 30 to the exterior 27 of the unit 11. The inventors have discovered that placing the open ends of the vent tube 40 in the filler 30 and exterior 27, respectively, that a better drying process results. It can be seen that the walls 40a and 40b of spacer 22 have been adapted to receive and retain vent tube 40. Preferably a retaining element is tightly inserted in the outer wall of spacer 22 to keep the seal and receive and retain vent tube 40. Preferably the retaining element is a cup 22a. For best performance, one end of the tube 40 should breathe from inside the absorptive material 30 in a point far enough from the perimeter that it receives maximum temperature swing. It is most convenient to pass the vent tube 40 through the spacer 22 and/or sealant 23 rather than through the glass lites 15, 20. The vent tube 40 should be made of a non corroding metal, typically stainless steel. In one preferred embodiment, the vent tube 40 could be a capillary tube.

The desired predetermined time constant should be chosen appropriately so that more moisture can leave the unit in times of higher exterior temperature (since warmer air can hold more moisture than colder air). Choosing a wrong time constant can slow the drying process and result in moisture accumulation, condensation and possibly failure of the unit. The system designed so that it has a time constant for venting that ranges from 15 mins to 12 hours, or for best performance, between 1.5 hr to 4 hours. As is discussed below, the preferred time constant is 2 hours. This introduces a phase lag for the air flow and permits the pressure equalization to be controlled. System time constant is a function of the thickness of the unit (as it increases, volume of air to be vented increased); the thickness of the lites of glass as well as their length and width (these factors control the 'rigidity' of the enclosure), and the vent tube sizing including length and inside diameter.

The following was discovered by the present inventors during research regarding time constants:

1) The time constant for the unit 11 increases with increasing flow resistance C (liters/minute) which is a function largely of the length and inside diameter of the tube 40. Since the pressure inside a glazing unit 11 increases as it is heated, and decreases as it is cooled, if a glazing cavity 10 is vented, air will flow out when the unit 11 is heated and in when cooled. The rate of flow is roughly proportional to the resistance of the flow path as well as the pressure differential.

2) The time constant reduces in response to increases in the ratio of the change in internal pressure to the change in internal air volume of cavity 10 (psi/liter), which is a property of the glazing unit depending on length, width, thickness, and thickness of lites 15, 20.

3) The pressure relief factor, or ratio of maximum pressure differential, for the vented unit 11 experienced during a daily temperature cycle to the maximum pressure differential generated in the same unit 11 if not vented, increases as the system time constant increases.

4) With a time constant of 2 hours, the pressure relief factor is 20%, or in other words, the maximum pressure change experienced by the unit is only 20% of an equivalent unvented unit. The time constant of 2 hours emerged as ideal for a variety of climate conditions.

5) The interior of a unit constructed in this manner will develop and maintain a lower absolute humidity, in response to daily temperature cycling as will occur in glazing units because of natural exterior temperature changes, and exposure to diffuse skylight and direct sunlight. It was found that a unit constructed in this manner expelled moisture three times faster than an equivalent conventional unit when cycled, and maintained a lower equilibrium humidity.

It should also be noted that there may be more than one vent tube used. The number of vent tubes that should be used varies based on the size of the lites. The inventors discovered that as the size of unit 11 increases, the time constant increases accordingly. Typically larger windows require more venting, which can be achieved by large tubes with higher flow constants, and/or more tubes. However, a time constant of 2 hours was still discovered to have the best drying process regardless of glass lite size.

Based on the above, one skilled in the art will now be able to select an appropriate vent tube 40 for a particular application. Preferably, the tube vent is 4" long. It was discovered that if the time constant is 2 hours and the vent tube length is 4", then the ideal inner diameter can be determined by the Hagen Poiseulle Equation as known by those skilled in the art. For further clarity, provided is a table of some example embodiments.

| Tube Gauge/ Type of Vent Tube | Inner Diameter of Vent Tube (inches) | Length of Vent Tube (inches) | Number of Tubes | Minor Dimension of Glass Lite (feet) | Flow Constant (lt/sec kPa) | Time Constant (hours) |
|---|---|---|---|---|---|---|
| 23 RW | 0.013 | 4 | 1 | 2 | 1.955E−04 | 1.8 |
| 22 RW | 0.016 | 4 | 1 | 3 | 4.485E−04 | 2.37 |
| 21 | 0.02 | 12 | 1 | 3 | 3.65E−04 | 2.76 |
| 20 RW | 0.024 | 4 | 1 | 4 | 1.915E−03 | 1.76 |
| 18 RW | 0.033 | 4 | 1 | 4.7 | 8.166E−03 | 1.6 |

This venting system in accordance with the teachings of this invention is advantageous because it can minimize internal moisture of a translucent glass glazing unit, so that internal condensation is reduced or eliminated, without the use of desiccant. Also, because this system maintains a natural equilibrium, it does not have a finite lifetime such as the lifetime of a conventional glazing unit using a desiccant, which is reached when the natural inward diffusion of moisture occurs for a long enough time that the desiccant becomes saturated. Also, because the system reduces maximum daily pressure differentials, stress on seals is reduced and the statistical incidence of glass breakage is reduced, making the units more reliable, and visual distortion of reflected images is reduced.

Some examples of transparent fillers that can be used in accordance with the teachings of this invention include: glass fiber veil, hydrophobic silica aerogel granules, acrylic honeycomb, glass fiber materials, acrylic honeycombs, fiberglass veil, cotton, or wool.

Here, the gap or cavity has been described as being the entire volume between inner and outer lites. In one embodiment, the cavity could actually be one cavity of a triple glazed unit. In this case, the cavity may be subdivided by an inner lite of glass or plastic sheet or plastic film. Only one cavity needs to be filled with an absorptive filler. This may be done to add extra insulation and/or sound insulation.

In one embodiment, the absorptive filler can be air, and in this embodiment a fiber glass is bonded to the inside of each glass lite.

EXAMPLE

The following is an example embodiment of a glazing unit in accordance with the teachings of this invention. This example embodiment uses 6 mm clear glass on both sides of a 2.5" gap, 4'×4' dimensions, filled with 2.5" acrylic honeycomb with 0.003" thick walls and 1 cm cell diameter as well as light diffusing glass fiber non woven fabric. Included is a thin walled aluminum spacer thermally separated from glass by adhesive foam tape ⅛" thick, and sealed with 2 part structural glazing silicone. Holes are drilled through the outer wall (0.120" dia.) and the inner wall for clearance for insertion of a capillary vent. The capillary tube is a #18 ga hypodermic needle, stainless steel, 4" long, 0.033" inside diameter. The tube passes through a hole in cup in a manner which retains tube and maintains seal. A cup is tightly inserted in hole in outer wall of spacer, using sealant where necessary to ensure seal. When the tube is inserted, the needle penetrates walls of honeycomb, and the end remains well within the honeycomb, away from spacer wall and resultant thermal edge effects, to a region where temperature and humidity cycle daily as required for full functionality of this device. The time constant is 2 hours, and the unit maintains a suitable level of dryness without desiccant.

Numerous modifications may be made without departing from the spirit and scope of the invention as defined in the appended claims.

What is claimed is:

1. A sealed translucent glass glazing unit, comprising:
    two spaced lites of translucent glass;
    a spacer connected with and between outer edge portions of said lites to define a sealed chamber within the unit;
    a temperature-responsive filler arranged in said chamber, the filler being made of an absorptive material which is responsive to temperature changes in ambient air within said chamber such that the filler absorbs moisture from the air within said chamber as the filler cools and releases moisture to the air within said chamber as the filler warms, said filler comprising at least one of glass fiber veil, hydrophobic silica serogel granules, acrylic honeycomb, glass fiber materials, acrylic honeycombs, silica aerogels, fiberglass veil, cotton and wool; and
    a vent tube mounted through the spacer with one end open to the absorptive filler within said chamber and one end open to an exterior of the unit, such that air flows through the vent tube from said chamber to the exterior of the unit when the filler is heated and air flows through the vent tube from the exterior of the unit to said chamber when the filler is cooled, the vent tube being sized to maintain controlled airflow according to a predetermined time constant, wherein natural humidity equilibrium of the unit is maintained without the use of a desiccant.

2. The sealed translucent glass glazing unit of claim 1, wherein the filler is acrylic honeycomb.

3. The sealed translucent glass glazing unit of claim 1, wherein the time constant is between 15 minutes and 12 hours.

4. The sealed translucent glass glazing unit of claim 3, wherein the time constant is about 2 hours.

5. The sealed translucent glass glazing unit of claim 1, wherein more than one of said vent tube is used.

6. The sealed translucent glass glazing unit of claim 1, wherein the vent tube is a capillary tube.

\* \* \* \* \*